United States Patent [19]
Hyde

[11] 3,768,304
[45] Oct. 30, 1973

[54] PIPELINE LEAK LOCATOR PLUG
[75] Inventor: Walter E. Hyde, Duncan, Okla.
[73] Assignee: Halliburton Company, Duncan, Okla.
[22] Filed: Mar. 27, 1972
[21] Appl. No.: 238,031

[52] U.S. Cl. ............................ 73/40.5 R, 340/242
[51] Int. Cl. ............................................ G01m 3/28
[58] Field of Search .................... 73/40.5 R, 49.1, 73/49.6; 340/224, 239, 242

[56] References Cited
UNITED STATES PATENTS
| | | | |
|---|---|---|---|
| 3,382,705 | 5/1968 | Cole | 73/40.5 R |
| 2,820,959 | 1/1958 | Bell | 340/239 R X |
| 2,951,362 | 9/1960 | EnDean et al. | 73/40.5 R |
| 3,117,453 | 1/1964 | Ver Nooy | 73/40.5 R X |
| 3,196,686 | 7/1965 | Cole | 73/40.5 R X |

Primary Examiner—Richard C. Queisser
Assistant Examiner—Joseph W. Roskos
Attorney—John H. Tregoning et al.

[57] ABSTRACT

A pipeline leak locator plug having a signal transmitter connected to a switch and having sealing cups and discs for sealingly engaging the interior of the pipeline, operates by a change in fluidic pressure caused by a leak in the pipeline, whereby a signal as to whether the leak is upstream or downstream is actuated by the pressure differential acting on the sealing cups through the switch to the transmitter.

14 Claims, 5 Drawing Figures

PIPELINE LEAK LOCATOR PLUG

BACKGROUND OF THE INVENTION

The use of pipelines as a means for transporting liquid and gaseous products is becoming more and more widespread each day. Pipelines are the prime means of transporting petroleum products and raw materials. Most of the natural gas used in this country must be transported by pipeline. Other products moving by this means of transportation include crude oil, gasoline, jet fuel, water, steam, cement, plastics, acids, and just about any form of liquid that has to be moved from one location to another, even including such unlikely fluids as milk or beer.

Of course all of these fluids must be pumped under relatively high pressures to obtain sufficient movement between shipping and receiving points. In order to prevent loss of fluids and possible contamination of the material, the pipeline must remain intact and fluid tight at all times. Leaks which occur naturally and fairly frequently include quickly located and repaired. Manufacturing defects in the pipe resulting in leaks must also be ferreted out.

This is even more imperative when the products being shipped are highly flammable and explosive, such as petroleum products, because pipelines carrying such products are frequently located where a fire or explosion could cause loss of life and large property damage.

As precautionary measure, pipelines which are to carry explosive products as well as pipelines handling other contaminable fluids, must be tested for leaks after they have been installed but prior to their first use. They must afterwards be checked periodically and also checked when a known leak has occurred or a leak is suspected.

In the case of large high pressure pipelines the testing operation can prove to be quite clostly, often running as high as fifty to one hundred thousand dollars for lengthy sections. This is the cost of testing alone.

The common procedure for testing an underground pipeline is to find two widely separated points on the pipeline exposed to the surface where valves are or may be located in the line. If these are not available the pipeline must be excavated at each point and a valve installed in the line by cutting and welding. Then at a point approximately half-way between the two valves, the line is excavated and a plug or blind flange is inserted into the line, once again by cutting and welding. A fluid such as distilled water is then pumped into the two isolated halves of the pipeline and pressured up and then the pressure is monitored in each section over a period of time to determine if either or both sections have a leak. The process is repeated by halving each section and then halving each half unitl the location of the leak is narrowed down sufficiently to locate the leak. This proves to be costly, time consuming process as each relocation of the blind flange involves uncovering the line, cutting into it, placing a blind in it and then rewelding. After testing, all blinds must be removed which is as troublesome as their installation.

An alternative to installing the welded blinds, which alternative is an improvement over that technique, is the use of freezing a bridge across the pipeline. This removes the necessity of cutting the line and welding in the blind flange, then recutting and rewelding when removing the flange. Freezing a bridge is fairly slow difficult because of the difficulty in freezing across the complete diameter of some large pipelines. This difficulty is alleviated somewhat by the use of a freeze plug such as that disclosed in U.S. Pat. No. 3,695,301, by Forrest Pittman.

Although the freeze plug device disclosed in the above pending application is a substantial improvement over the known methods of plugging a line for testing, it requires that a line be uncovered for each plug or bridge to be installed in the line. It also requires cooling apparatus for application of freezing medium to the pipeline, although the freezing is greatly facilitated compared to the methods known in the prior art.

What the prior art lacks and what has been long needed for testing pipelines is a plugging device which can be actuated to isolate sections of a pipeline without having to uncover and cut the pipeline or uncover and apply a freezing medium to the pipeline.

The present invention solves the problems of the prior art by providing a device which can be flowed down a pipeline to a predetermined desirable position, which device then indicates by radio or electronic signals in which direction the leak is located from the device without having to uncover the pipeline except to repair the leak.

DESCRIPTION OF THE PREFERRED EMBODIMENTS

Figure 1:
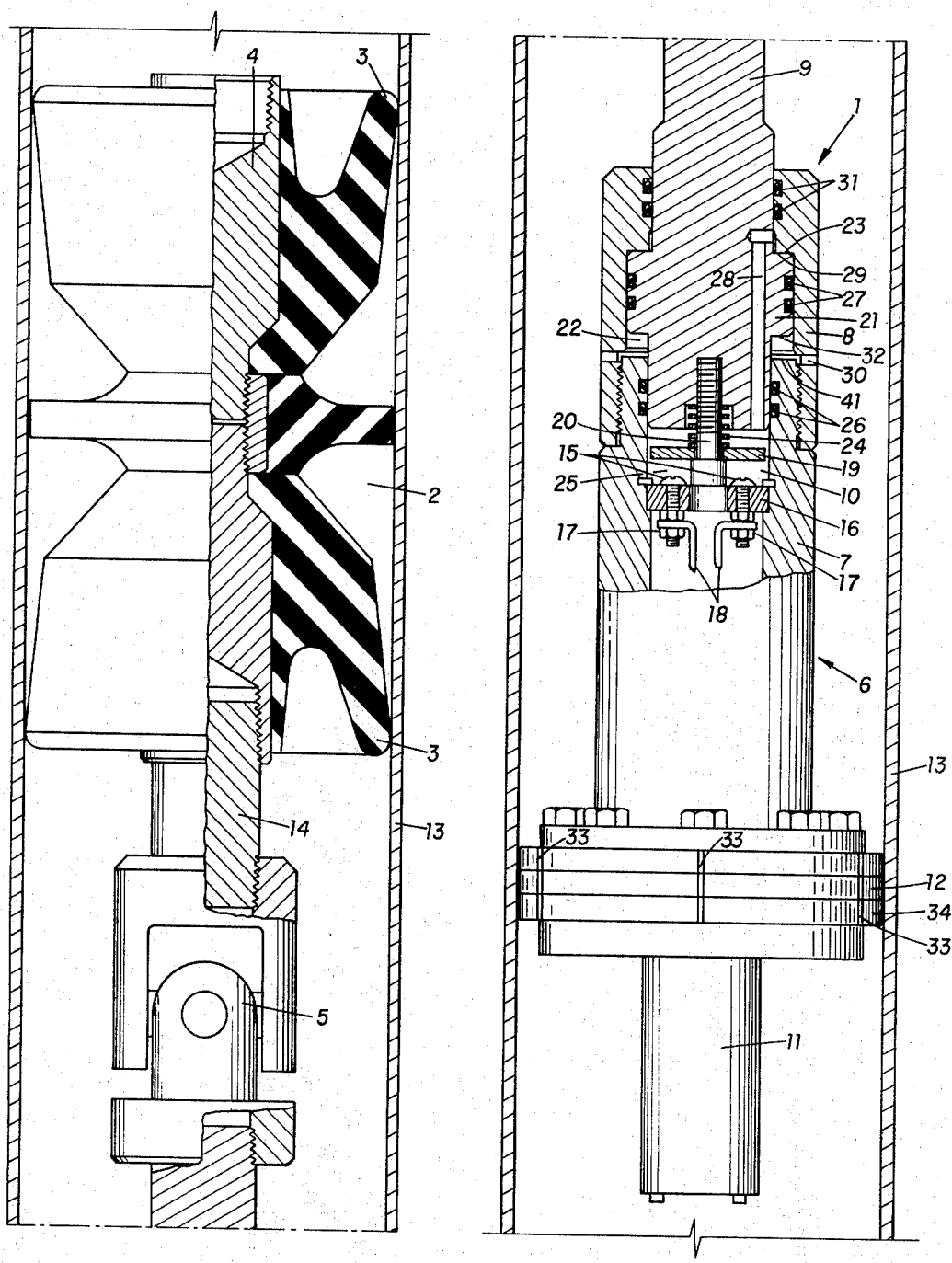
FIG. 1 is a view partly in cross-section of the testing plug in its expanded, open-switch position.

FIG. 1 depicts the locator device 1 as at appears when being flowed through pipeline 13. The device 1 consists of a sealing means 2 which has one or more elastomeric sealing cups 3 located axially along a central sealing member 4. Connected to the sealing member 4 by swivel or universal joint 5 is the transmitting member 6 which consists of outer housing 7, slip joint housing 8, piston mandrel 9, swtich 10, and transmitter 11.

Located circumferentially around and fixedly attached to outer housing 7 are one or more drag discs 12 made of a tough semi-elastomeric material such as urethane.

Switch 10 located within housing 7 consists of stationary contact surfaces 15 fixedly attached to housing 7 by an appropriately insulated plate 16. Passing through plate 16 are contact terminals 17 to which are attached electrical leads 18. Leads 18 are connected to transmitter 11 which is a radio transmitter capable of emitting a steady or intermittent radio signal. Transmitter 11 can be powered by any available portable power source such as a storage battery or fuel cell (not shown).

Switch 10 further consists of movable contact surface 19 which is a conductive plate attached by a stud 20 to piston mendrel 9. The conductive plate tends to bridge across terminals 15 in the closed-switch position and forms a conductive patch across the terminals thereby activating the transmitter into emitting a changed signal, such as an intermittent signal, from that emitted in the open-switch position. Surface 19 may be insulated from stud 20 to prevent grounding leads 18 to the pipeline.

Piston mandrel 9 is a cylindrical member located partially within housings 7 and 8 in a telescopic arrangement and having an annular piston shoulder 21 extending into chamber recess 22 in housing 8. Shoulder 21 allows limited telescopic movement of piston mandrel 9 between housings 7 and 8. Telescopic movemment is limited by face 32 abutting the face 41 housing 7 when the device is being contacted, and is limited in its extended position by shoulder 21 abutting shoulder 23 of housing 8.

Coil spring 24 is located on stud 20 between contact surface 19 and mandrel 9 and maintains contact surface 19 against contacts 15 when the piston mandrel is in the closed-switch position. The spring also serves to absorb the shock of contact surface 19 striking contacts 15 when closing the switch.

Atmospheric pressure is maintained in switch chamber 25 by circular seals 26, 27, and 31. Mandrel channel 28 communicates atmospheric pressure from chamber 25 to the opposite side 29 of shoulder 21 which is designed to have the same annular area as the cross-sectional area of switch chamber 25, thereby counterbalancing atmospheric pressure across the telescopic arrangement of parts 8 and 9. Hydrostatic pressure balance across the same telescopic arrangement is provided by one or more hydrostatic ports 30 passing through the wall of housing 8 providing fluid communication between the fluid in the pipeline and the shoulder 21. The annular area of face 32 of shoulder 21 is equal to the cross-sectional area of mandrel 9, thereby providing a counter force tending to balance the naturally occurring hydrostatic force which would normally drive mandrel 9 into switch chamber 25 because of the relatively low atmospheric pressure in chamber 25.

Figure 4:
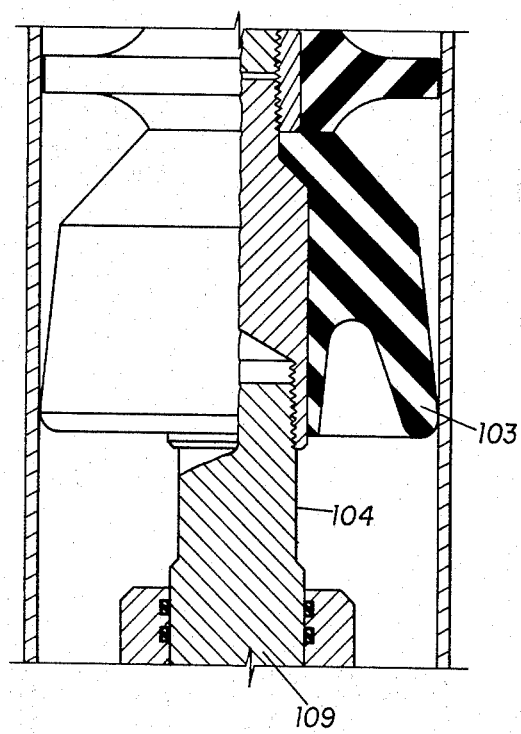
FIG. 4 illustrates an alternative embodiment of a locator plug not having axial flexibility.

In FIG. 4 an alternative locator plug is partially illustrated which does not exhibit axial flexibility but is shorter to allow it to traverse mild bends and curves in the pipeline. This device has an integral member 104 containing on one end the sealing cups 103 and at the other end piston mandrel 109. This can be one integral unit or can be two or more separate members fixedly attached by threads, welds, or some other means of rigidly attaching them together.

Figure 5:
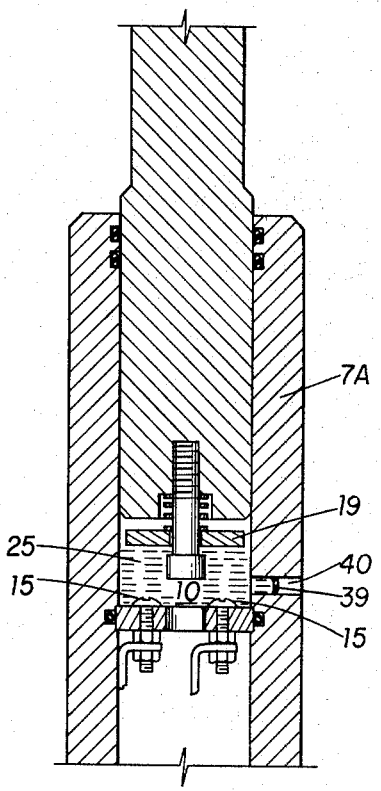
FIG. 5 illustrates an alternative embodiment of the locator plugs of FIGS. 1 and 4 without the pressure balancing feature.

Referring now to FIG. 5, it is possible to use the locator plugs of FIGS. 1 and 4 without the pressure balancing features by using one of two methods. The first method involves using a non-electrolytic, non-conducting fluid in switch chamber 25 and connecting this chamber to a pressure transmitting diaphragm means 39 which is in contact with hydrostatic pressure in the pipeline. Such a means as shown in FIG. 5 is located in a channel 40 leading from the switch chamber 25 directly to the exterior of housing 7A. This would eliminate the need for shoulder 21, recess 22, channel 28, and ports 30 of FIGS. 1 and 2. A second method of eliminating the pressure balance features would be to remove the diaphragm 39 from channel 40 and allow fluid under pressure in the pipeline to communicate throughout chamber 25. This would necessitate insulating the exposed parts of switch 10 sufficiently to prevent shorting out of the switch by the hydrostatic fluid. This could be done by one of many ways known in the electrical arts, for instance by coating the exposed parts, or enclosing them in an airtight bellows.

Figure 2:
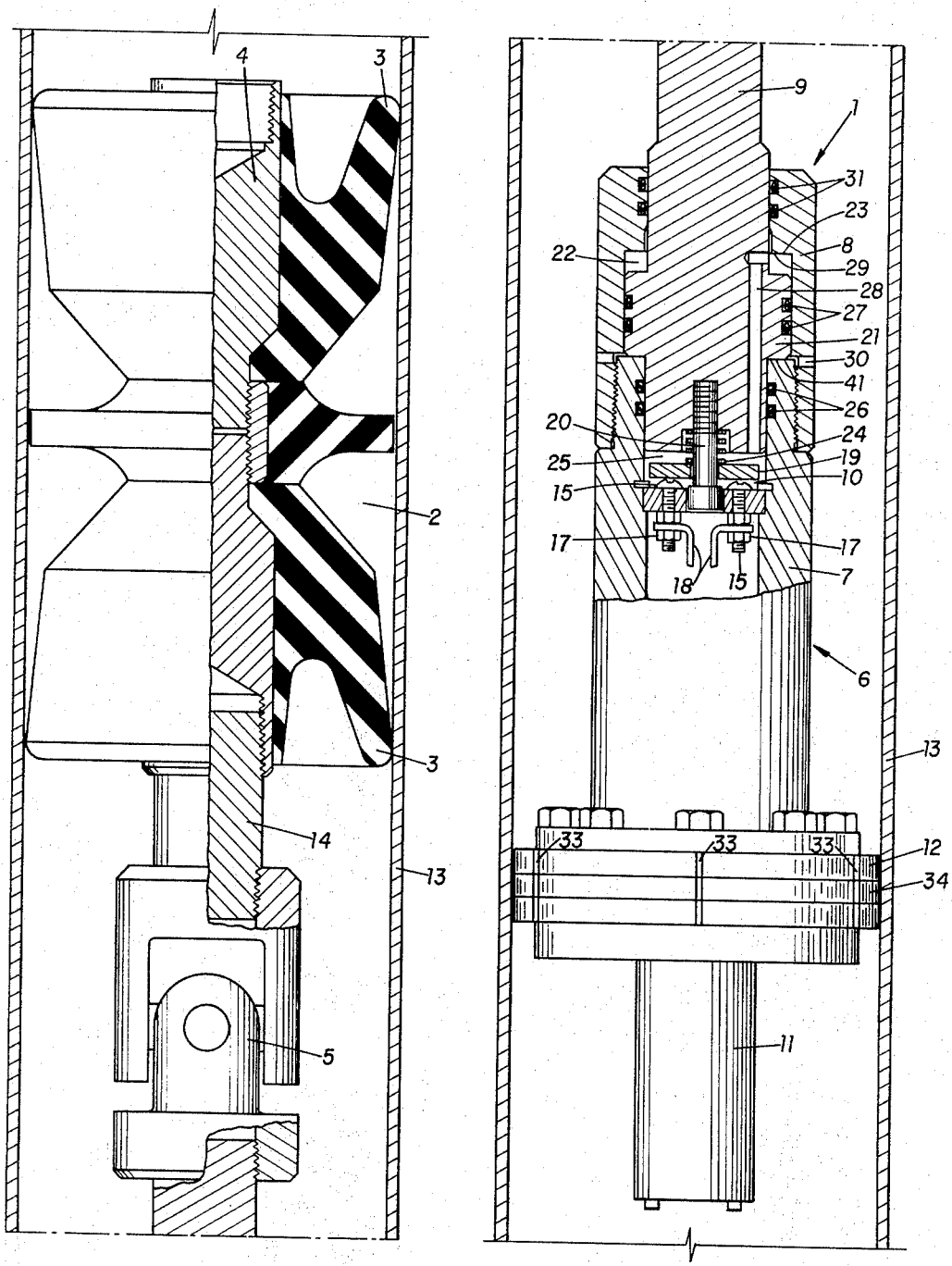
FIG. 2 is a view partly in cross-section of the testing plug in its contracted, switch-closed position.
Figure 3:
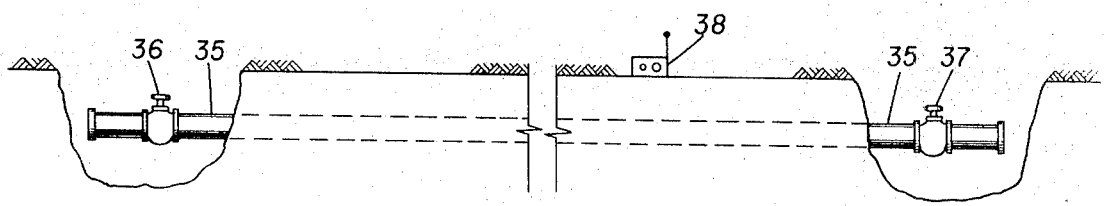
FIG. 3 is a schematic drawing of the device depicted in an underground pipline.

In typical operation, referring now to FIG. 3 as well as FIGS. 1 and 2, the locator plug 1 is placed into the pipeline 35 to be tested and a fluid such as water is pumped into the pipeline behind the plug. The sealing end 2 of the plug is usually placed in the line first and is therefore the downstream end when fluid is intially pumped.

Drag discs 12 supply friction drag to the transmitter end 11 of plug 1 but do not fluidically seal against the pipeline. This can be achieved by providing one or more grooves 33 in the outer periphery 34 of discs 12 to allow fluid to communicate past the discs. This is necesary for correct operation of the locator plug. An alternative to grooving discs 12 is to drill holes or ports through the discs between housing 7 and the outer periphery 34 of the discs.

When a fluid such as water is pumped in behind the plug, the fluid pressure bypasses the discs 12 and engages the sealing means 2 causing a pressure differential across the sealing means which drives it down the pipeline. The sealing means acting through universal joint 5 pulls the switch and transmitter sections of the plug along with it. A universal joint 5 is used to obtain greater flexibility in pipe bends and curves.

In pulling the transmitter and switch means along, the sealing means also maintains the switch 10 full-open position, with contact surface 19 at its furthest point away from contacts 15.

When a sufficient quantity of fluid has been pumped into the pipeline to place the locator plug at the desired position in the pipeline, which for instance could be half-way down the section to be tested, the discharge valve 36 of pipeline 35 ahead of the plug is closed and the pressure is raised throughout the pipeline section to the desired test pressure. At this point, valve 37 is closed at the pump end with fluid pressure being equalized throughout the entire section of line to be tested.

If, this time, it is not known if there is any leak in the line at all, for instance if this is a brand new pipeline being tested, pressure readings can be taken at each end of the line after a period of time to determine if there is a leak in the line.

At the point in time when the pumping is stopped and pressure is equal throughout the line, switch 10 is open, transmitter 11 is emitting a steady signal, and a person at the ground level carrying a receiver 38 can pinpoint the exact location of the locator plug in the pipeline. After waiting a sufficient time to allow pressure in either half of the line to bleed down, the receiver operator again monitors the signal emanating from the transmitter in the locator plug. If the signal remains steady and pressure readings indicae there is no leak, then the locator plug is removed from this pipeline and may be used in another line, if desired. If pressure readings indicate there is a leak, the signal emanating from the locator plug will tell the receiver operator in which half of the line the leak is located. If the leak is downstream or to the left of sealing end 2 of the plug, a pressure differential will soon result across the sealing cups 3 with low pressure on the left, and high pressure on the right of the cups. This results in a force which tends to push the sealing means downstream which, acting through universal joint 5 and mandrel 9, maintains switch 10 open and keeps transmitter 11 emitting steady signals.

Thus, the receiver operator at the surface knows that the leak is downstream of the plug.

Referring now to FIG. 2, if the leak is located upstream or to the right of the plug, the pressure differential across cups 3 would be the reverse and the sealing means 2 would begin to flow to the right under the action of the pressure force acting on the left of it. No pressure differential exists across drag discs 12 due to grooves 33 but the drag friction induced by the discs prevents this section of the plug from flowing in response to the pressure differential on sealing means 2. Thus, seal means 2 will push sealing member 4, universal joint 5, and mandrel 9 back upstream to the right into housings 7 and 8, and as a result, switch 10 will become closed when contact surface 19 touches contact surface 15. This will change the radio signal emitted by transmitter 11 into an intermittent signal and the receiver operator will know that the leak is upstream, or to the right, of the locator plug.

Then in a process of elimination, the plug can be moved halfway into the section of line wherein the leak is located by opening valves 36 and 37 and flowing fluid in the appropriate end of the line. The valves are closed, the line is pressured up to equal pressure throughout, and the process is repeated until the location of the leak is narrowed down sufficiently to allow it to be uncovered and repaired.

The method above involves a process of halving the section of pipeline and then halving the half over and over until the leak is sufficiently pinned down. An alternative method would be to start at one end and work towards the other end in relatively small, substantially equal increments.

When a leak is determined to be to the right of the plug, or upstream, the plug can be flowed to the right which is the reverse of its general flow direction. This is accomplished by opening valve 37 and pumping in fluid through valve 36 which establishes a pressure differential across seal cups 3 causing the plug to move back up the pipeline. When moving upstream such as this, the switch will be in a closed position and the transmitter will be broadcasting intermittent signals. When the locator plug is in the desired position, pumping of fluid is stopped, valves 36 and 37 are closed, and the line pressure is equalized at a desirable high level.

Even though transmitting intermittently, the locator plug can easily be located by the receiver operator who then monitors the signal. If the signal remains intermittent over a substantial period of time this means that the leak is still upstream, or to the right. If the signal changes to continuous broadcast then the leak is known to be to the left of the plug, downstream. Thus, it is apparent that the important factor involved in the operation of the locator plug 1 is whether or not the radio signal undergoes a change after the locator plug has been in place in the closed-off pressurized line a sufficient period of time. A change in the signal indicates the leak being in one direction from the plug and no change in the signal indicates the leak is in the opposite direction.

The transmitter 11 can be chosen from any commercially available compact portable signal transmitter which carries its own power source, such as a battery. Alternatively a transponder type radio transmitter could be utilized which transmits only in response to an external actuating signal generated by the receiver operator at the surface. Use of this type device would extend battery life in the locator plug many times over.

Although a specific preferred embodiment of the present invention has been described in the detailed description above, the description is not intended to limit the invention to the particular forms or embodiments disclosed herein since they are to be recognized as illustrative rather than restrictive, and it will be obvious to those skilled in the art that the invention is not so limited. For example, the sealing means of this invention could be any elastomeric protusion which contacts the full circumference of the inner surface of the pipeline. It is also possible to use several sealing means in series, connected by several universal joints. The switch illustrated is a two-pole switch closed by a conducting member but could be any other known form of switch such as a mercury switch or toggle switch. It is also contemplated that if axial flexibility were not desired in the device then it could be made as one rigid member by removing the universal joint or joints and making the seal member 4 an integral or fixedly attached part of the piston mandrel 9. An alternative arrangement of the sealing cups 3 and drag discs 12 would be to switch their positions, putting the drag discs on member 4 and the sealing cups 3 on housing 7. This arrangement would work equally well. Thus, the invention is declared to cover all changes and modifications of the specific embodiments of the invention herein disclosed for purposes of illustration, which do not constitute departures from the spirit and scope of the invention.

What is claimed is:

1. An apparatus for locating leaks in a pipeline comprising:
    a. first body means adapted to be disposed generally axially within a pipeline;
    b. second body means connected to said first body means, said second body means also adapted to be disposed generally axially within a pipeline;
    c. seal means on said first body means capable of fluidically sealing off an inner cross-sectional area of the pipeline;
    d. switch means within said second body means responsive to axial movements of said first body means;
    e. means for transmitting radio signals from within said pipeline, said transmitting means being located within said apparatus and being adapted to respond to said switch means; and
    f. means located on said second body means for providing frictional drag on said apparatus by contacting the inner surface of the pipeline and also adapted to provide fluid communication from one side of said friction means to the other side of said friction means.

2. The apparatus of claim 1 further comprising pressure balancing means disposed within said apparatus for preventing pressure differential on said switch means from closing and opening said switch means.

3. The apparatus of claim 2 wherein said second body further comprises:
    a. a cylindrical piston mandrel having external annular piston shoulder means thereon;
    b. cylindrical tubular housing means telescopingly enclosing a portion of said piston mandrel and containing an inner annular recess adapted to receive said annular piston shoulder in piston-like arrangement;

c. switch actuating means attached to said piston mandrel and adapted to open and close said switch means in response to axial movements of said piston mandrel; and d. seal between said mandrel and said housing means for preventing fluid communication between said switch and the fluid area external to said housing.

4. The apparatus of claim 3 wherein said seal means on said first body comprises annular elastomeric cups which sealingly engage the inner surface of the pipeline about their entire periphery, and said seal means between said mandrel and said housing means comprises circular 0-ring seals made of elastomeric material.

5. The apparauts of claim 1 wherein said first body means is rigidly connected to said second body means.

6. The apparatus of claim 1 wherein said first body means is flexibly connected to said second body means.

7. A pipeline leak locator plug comprising:
a. first body means;
b. said body means telescopically fitted partially within said first body means and capable of limited telescopic movement within said first body means;
c. said first and second body means capable of being interposed axially within a pipeline;
d. sealing means located on one of said body means for sealingly closing a cross-sectional area of said pipeline;
e. drag inducing means on said other body means for inducting drag friction in said other body, said drag inducing means adapted to allow fluid communication past it in said pipeline;
f. means for controlling a signal transmitter, said means being located in said locator plug and responsive to telescopic movement between said first and second bodies and capable of changing the type of signal transmitted;
g. signal transmitting, means located in said locator plug and connected to said controlling means and adapted to transmit two different signals in response to said controlling means; and
h. means for equalizing pressure across said telescopically mounted first and second means.

8. The leak locator of claim 7 wherein said signal transmitting means comprises a radio transmitter powered by electrical storage means.

9. The leak locator plug of claim 8 wherein said radio transmitter is capable of sending continuous signals and intermittent signals in response to said controlling means, and said electrical storage means is a battery.

10. The leak locator plug of claim 9 further comprising means attached to said signal transmitting means capable of activating said transmitting means for a desired period of time upon command from a location remote from said locator plug.

11. The leak locator plug of claim 10 wherein said drag inducing means comprises discs made of a semi-elastic substance and said discs contact the inner surface of the pipeline and said seal means comprises circular sealing cups made of elastomeric substance contacting the inner surface completely around the periphery of said cups.

12. The leak locator plug of claim 11 wherein said means for equalizing pressure comprises channel means through said first body means adapted to provide fluid communication from said pipeline to said signal controlling means, with said signal controlling means having an electrically insulated coating to prevent electrical failure due to shorting by the pipeline fluid.

13. The leak locator plug of claim 11 wherein said means for equalizing pressure comprises a non-conductive, non-electrolytic fluid surrounding said controlling means, channel means through said first body means from said controlling means, and pressure transmitting diaphragm means located in said channel means between said non-electrolytic fluid and the pipeline fluid.

14. The leak locator plug of claim 11 wherein said means for equalizing pressure comprises an annular piston shoulder on said second body means located within a recess in said first body means, said shoulder having one annular face with surface area equal to the cross-sectional area of said second body means in said first body means and said annular face on said shoulder in fluid communication with the pipeline fluid and arranged to counter-balance the pressure from the pipeline fluid, which pressure tends to force said second body means into said first body means; said shoulder means having a second face on the opposite side of said shoulder, said second face in communication with said controlling means, said controlling means being sealed off at atmospheric pressure from the pipeline fluid and said second face being of equal annular area to the cross-sectional area of said controlling means, said second face arranged to counter-balance the atmospheric pressure of said controlling means.

* * * * *

PC-816

UNITED STATES PATENT OFFICE
CERTIFICATE OF CORRECTION

Patent No. 3,768,304           Dated  October 30, 1973

Inventor(s)  WALTER E. HYDE

It is certified that error appears in the above-identified patent and that said Letters Patent are hereby corrected as shown below:

In column 1, lines 20 and 21, after "frequently" delete "include" and insert therefor --must be--.
In column 1, line 56, between "be" and "costly" insert --a--.
In column 1, lines 66 and 67, between "slow" and "difficult" insert --and--.
In column 2, line 66, change "mendrel" to "mandrel".
In column 3, line 13, between "41" and "housing" insert --of--.
In column 4, line 41, after the comma, first occurrence, insert --at--.
In column 5, line 16, add --s-- to the end of "surface".

IN THE CLAIMS:

In claim 5, column 7, line 14, change "apparauts" to "apparatus".
In claim 7(b), column 7, line 20, delete "said" and insert therefor --second--.
In claim 7(g), column 7, line 37, delete the comma between "transmitting" and "means".

Signed and sealed this 9th day of April 1974.

(SEAL)
Attest:

EDWARD M. FLETCHER, JR.
Attesting Officer

C. MARSHALL DANN
Commissioner of Patents